Martin & Bloches.
Hay Fork.
No. 76,787. Patented April 14, 1868.
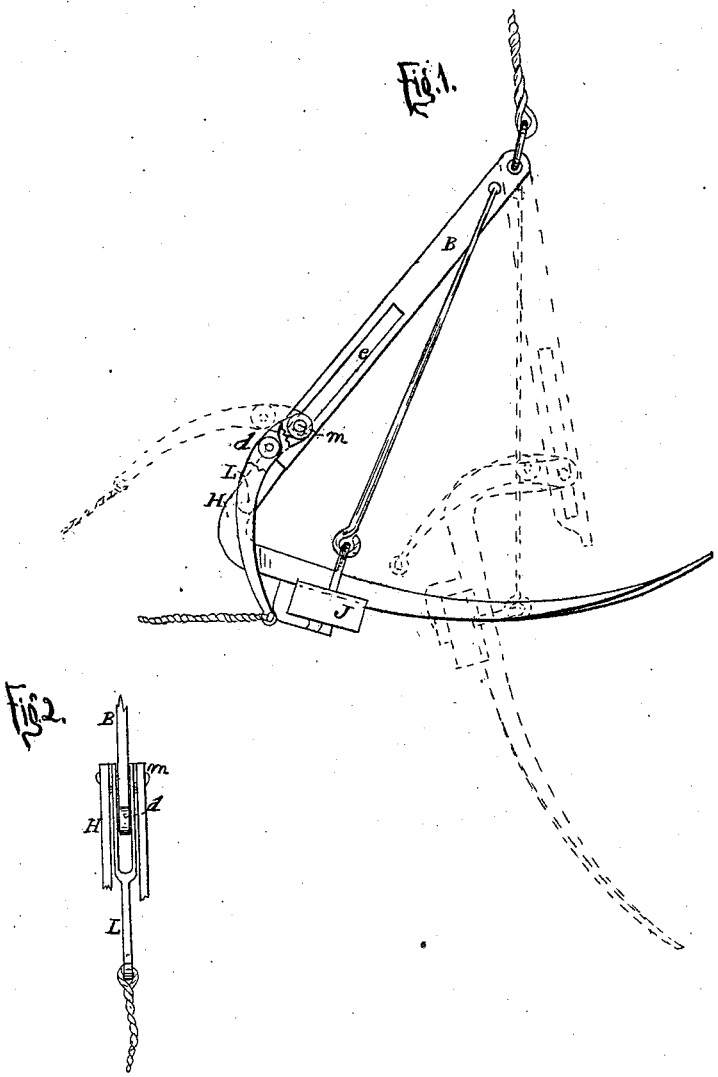

United States Patent Office.

ANTHONY M. MARTIN AND JOHN C. BLOCHER, OF BLOOMVILLE, OHIO.

Letters Patent No. 76,787, dated April 14, 1868.

IMPROVEMENT IN HORSE HAY-FORKS.

The Schedule referred to in these Letters Patent and making part of the same.

TO ALL WHOM IT MAY CONCERN:

Be it known that we, ANTHONY M. MARTIN and JOHN C. BLOCHER, of Bloomville, in the county of Seneca, and State of Ohio, have invented a new and useful Improvement on Hay-Elevators; and we do hereby declare that the following is a full, clear, and exact description of the construction and operation of the same, reference being had to the annexed drawings making a part of this specification, in which—

Figure 1 represents the position of the hay-elevator when loaded, the dotted lines representing its position when the load is discharged.

Figure 2, back view of curved lever.

The hay-elevator, when loaded, is drawn up into the mow in the position of fig. 1, it being held in that position by the wheel $d$, Figure 3, rolling under the foot of the brace B, fig. 1, it then being discharged, by drawing on the rope K, attached to the curved lever L, rolling the wheel $d$ out from under the foot of the brace B, letting the heel of the tines T rise up, and the point of the tines drop down.

The two central tines are bent up from the point H, in rear of the bar J, and between their upper ends the curved lever L is pivoted, as shown in the drawings.

We do not claim the brace B, fig. 1, but

We do claim—

The horse hay-fork constructed as described, having its central tines bent upward, in rear of the bar J, to receive the end of the pivoted lever L, bearing the roller $d$, said roller adapted to fit under the lower end of the curved slotted brace B, when the fork is loaded, and withdrawn therefrom to permit the brace to slide, by its slot, $e$, upon the rod $m$, in said lever, to discharge the load, as herein shown and described.

ANTHONY M. MARTIN,
JOHN C. BLOCHER.

Witnesses:
   DANIEL BEHM,
   BENJAMIN KNAPP.